United States Patent
Di Federico et al.

(10) Patent No.: US 7,848,865 B2
(45) Date of Patent: Dec. 7, 2010

(54) METHOD AND SYSTEM FOR APPLYING MATERIALS TO CROPS

(75) Inventors: Ivan Di Federico, Argenta (IT); Michael John Gomes, Rancho Murieta, CA (US)

(73) Assignee: TSD Integrated Controls, LLC, Livermore, CA (US)

( * ) Notice: Subject to any disclaimer, the term of this patent is extended or adjusted under 35 U.S.C. 154(b) by 885 days.

(21) Appl. No.: 11/787,526

(22) Filed: Apr. 17, 2007

(65) Prior Publication Data

US 2008/0191054 A1 Aug. 14, 2008

Related U.S. Application Data

(60) Provisional application No. 60/900,410, filed on Feb. 9, 2007.

(51) Int. Cl.
 *A01B 69/00* (2006.01)
(52) U.S. Cl. .................................................... 701/50
(58) Field of Classification Search .................. None
 See application file for complete search history.

(56) References Cited

U.S. PATENT DOCUMENTS

| | | | |
|---|---|---|---|
| 3,959,924 A | 6/1976 | Allen, Jr. | |
| 4,738,377 A | 4/1988 | DeMoss, Jr. | |
| 5,033,397 A | 7/1991 | Colburn, Jr. | |
| 5,144,767 A | 9/1992 | McCloy et al. | |
| 5,296,702 A | 3/1994 | Beck et al. | |
| 5,389,781 A | 2/1995 | Beck et al. | |
| 5,507,115 A | 4/1996 | Nelson | |
| 5,585,626 A | 12/1996 | Beck et al. | |
| 5,684,476 A | 11/1997 | Anderson | |
| 5,763,873 A | 6/1998 | Beck et al. | |
| 5,789,741 A | 8/1998 | Kinter et al. | |
| 5,793,035 A | 8/1998 | Beck et al. | |
| 5,809,440 A | 9/1998 | Beck et al. | |
| 5,833,144 A | 11/1998 | Kinter | |
| 5,837,997 A | 11/1998 | Beck et al. | |
| 5,842,307 A * | 12/1998 | May | ............ 47/1.7 |
| 5,870,686 A | 2/1999 | Monson | |

(Continued)

FOREIGN PATENT DOCUMENTS

DE 199 13 971 9/2000

(Continued)

OTHER PUBLICATIONS

PCT International Search Report corresponding to PCT Patent Application PCT/US2007/021372 filed Oct. 5, 2007 (5 pages).

(Continued)

*Primary Examiner*—Michael J. Zanelli
(74) *Attorney, Agent, or Firm*—Wolff & Samson PC

(57) ABSTRACT

Disclosed is a material delivery system and method for applying material to one or more crops. A sensor, or crop sensing head, moves over or near the crops and obtains crop data. An applicator is configured to apply the material onto the crop(s). An applicator controller can control the applicator. A material delivery vehicle has a delivery vehicle controller configured to control the material delivery vehicle and an agriculture controller in communication with the delivery vehicle controller, applicator controller, and sensor. The agriculture controller can determine the needs of the crops and adjust the movement of the delivery vehicle based on the needs of the crops.

23 Claims, 5 Drawing Sheets

U.S. PATENT DOCUMENTS

| | | |
|---|---|---|
| 5,924,239 A | 7/1999 | Rees et al. |
| 5,995,895 A * | 11/1999 | Watt et al. ..................... 701/50 |
| 6,062,496 A | 5/2000 | Kinter |
| 6,144,910 A * | 11/2000 | Scarlett et al. ................ 701/50 |
| 6,236,924 B1 | 5/2001 | Motz et al. |
| 6,393,927 B1 | 5/2002 | Biggs et al. |
| 6,443,365 B1 | 9/2002 | Tucker et al. |
| 6,444,975 B1 | 9/2002 | Reusch |
| 6,596,996 B1 | 7/2003 | Stone et al. |
| 6,601,341 B2 | 8/2003 | Raun et al. |
| 6,855,933 B2 | 2/2005 | Stone et al. |
| 6,880,291 B2 | 4/2005 | Raun et al. |
| 6,919,959 B2 | 7/2005 | Masten |
| 7,081,611 B2 | 7/2006 | Scott |
| 2003/0018423 A1 * | 1/2003 | Saller et al. ................... 701/50 |
| 2004/0034459 A1 * | 2/2004 | Hoelscher et al. ............. 701/50 |
| 2004/0231239 A1 | 11/2004 | Raun et al. |
| 2004/0237394 A1 | 12/2004 | Mayfield et al. |
| 2005/0098713 A1 | 5/2005 | Holland |

FOREIGN PATENT DOCUMENTS

WO    WO 2005/107432    11/2005

OTHER PUBLICATIONS

PCT Written Opinion of the International Searching Authority corresponding to PCT Application PCT/US2007/021372 filed Oct. 5, 2007 (6 pages).

* cited by examiner

METHOD AND SYSTEM FOR APPLYING MATERIALS TO CROPS

This application claims the benefit of U.S. Provisional Application No. 60/900,410 filed Feb. 9, 2007, which is incorporated herein by reference.

BACKGROUND OF THE INVENTION

The present invention relates generally to the application of materials such as fertilizer and chemicals to crops and more specifically to automated machines and methods used for the application of the materials to the crops.

Farmers apply natural and/or synthetic materials to their crops. The material (e.g., fertilizer, seeds, nutrients, water, chemicals, etc.) is typically applied at a single, uniform application rate across a field (i.e., an area). The determination of an optimal application rate for material has often relied upon: a) analysis of soil samples, b) scouting of the physical crop as it grows, c) destructive analysis of tissue or leaf samples of the growing crop, or d) comparative analysis to a "reference strip" of crop planted in that same field and fertilized at a rate known to exceed crop needs. These techniques have resulted in over-application or excess use of material in some areas of the field and under-application and a corresponding deficiency of material in other areas. Both cases often result in the loss of time and money, with a potential to cause irreparable harm.

Instead of applying material at a uniform rate, material can also be applied at a varying rate or multiple, predetermined rates within a field or area of interest. Systems that apply material in this fashion typically use traditional methods to determine an optimal amount of material to be applied to a particular area of a field. Often these techniques have used various reflectance-based technologies in conjunction with a historical database or other reference to determine the appropriate application rates for material. In addition, various reflectance based sensors have been used as a diagnostic tool in this effort.

Material can also be applied in an automated fashion. For example, material can be applied using automated machinery that drives around a field of crops and applies (e.g., sprays or spreads) material onto the crops. To apply an amount of material onto the crops, systems conventionally control one or more applicators (e.g., a sprayer valve and/or a spreader valve) on or attached to the automated machinery (e.g., a tractor).

BRIEF SUMMARY OF THE INVENTION

Despite controlling one or more applicators, current systems and techniques experience problems delivering a correct amount of material to crops. Specifically, a controller controlling the applicators (e.g., valves) delivering the material typically controls only the applicators. The vehicle (e.g., a tractor) moving along the field moves at a particular rate which may vary depending on, for example, the layout of the field or area. The vehicle may also change direction, such as when the vehicle has to turn to fertilize new crops.

With prior art techniques, a crop may not receive the correct amount of material that the applicator is programmed to apply to the crop when the vehicle changes speed or direction. Therefore, there is a need to integrate data corresponding to the movement of the vehicle with data corresponding to the needs of the crop to more accurately apply the material to the crops.

In accordance with an aspect of the present invention, an apparatus configured to apply material to a crop in a field includes a delivery vehicle configured to move across (i.e., across, along, around, etc.) the field and a sensor configured to obtain crop data. The apparatus also includes a delivery vehicle controller configured to automatically control movement of the delivery vehicle and an agriculture controller configured to determine the needs of the crop based on the crop data and also configured to transmit movement commands to the delivery vehicle controller to adjust the movement of the delivery vehicle based on the needs of the crop.

The apparatus may also include an applicator controller in communication with the agriculture controller and a material applicator (e.g., a spreader valve and/or a sprayer valve). The applicator controller is configured to control the material applicator. Further, the movement commands may be based on applicator data that is received from the applicator controller. The agriculture controller can also include a data logger to log the crop data (and/or the applicator data).

In one embodiment, there are several delivery vehicles that communicate with each other (e.g., in a peer-to-peer relationship or a master/slave relationship). For example, a second delivery vehicle may include a second agriculture controller and a second delivery vehicle controller. The second agriculture controller can be in communication with the agriculture controller and the second delivery vehicle controller, and configured to transmit movement commands to the second delivery vehicle controller to adjust the movement of the second delivery vehicle based on the needs of the crop.

In another aspect of the present invention, a method of operation of a delivery system for real-time application of material to a crop includes sensing crop data, determining needs of the crop from the crop data, and controlling movement of the delivery system based on the needs of the crop. The controlling of movement may occur by transmitting movement commands to a delivery vehicle controller controlling a delivery vehicle (which is part of the delivery system).

The controlling of movement may produce various results. For example, it may result in a change in direction of the delivery vehicle (and therefore delivery system), a change in speed, the following of a predetermined path, and/or the adjusting of a gear set in a transmission system of the delivery vehicle (e.g., to minimize fuel consumption in relation to a slope of a position of the delivery vehicle or in relation to the speed of the delivery vehicle). In one embodiment, the adjusting of speed of the delivery vehicle causes the delivery vehicle to reduce speed when a desired application rate of the material is greater than a maximum application rate at a current speed. In another embodiment, the adjusting of the speed of the delivery vehicle causes the delivery vehicle to increase speed when a desired application rate of the material is less than a minimum application rate at a current speed.

These and other advantages of the invention will be apparent to those of ordinary skill in the art by reference to the following detailed description and the accompanying drawings

DETAILED DESCRIPTION

Figure 1:
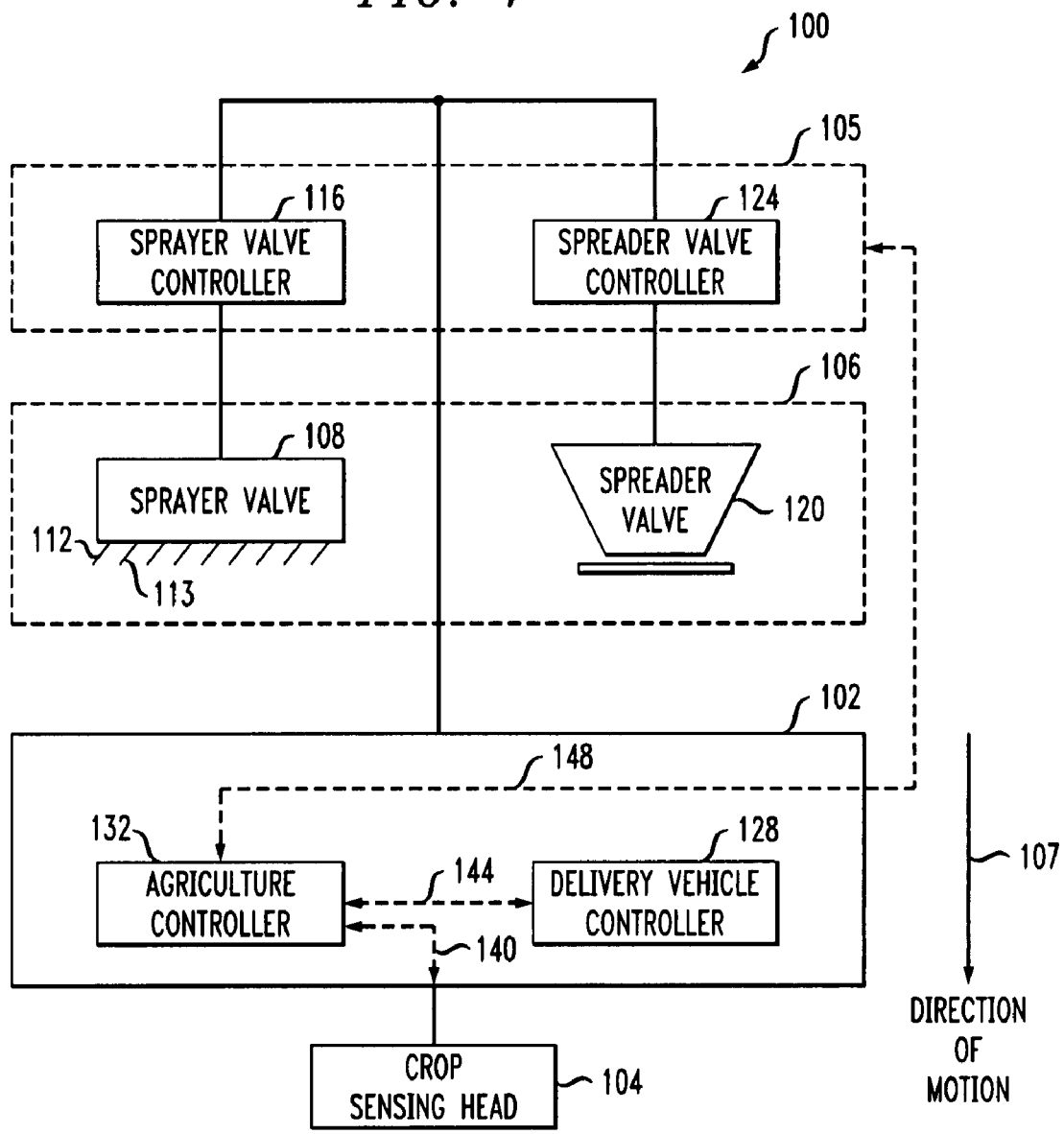
FIG. 1 is a block diagram of a material delivery system in accordance with an embodiment of the present invention.

FIG. 1 is a block diagram of a material delivery system 100 in accordance with an embodiment of the present invention. The material delivery system 100 includes a material delivery vehicle 102 connected to a crop sensing head 104 (i.e., a sensor), an applicator controller 105 (shown with dashed lines), and an applicator 106 (shown with dashed lines). The applicator 106 may be part of a plough attached to the delivery vehicle 102. Although shown as separate components, one or more of the above components (e.g., vehicle 102, crop sensing head 104, applicator controller 105, and/or applicator 106) may be combined into a single unit.

The material delivery vehicle 102 is machinery that moves across a field (i.e., moves along, across, or around a field) to apply material to one or more crops (not shown) in the field in real-time. The material delivery vehicle 102 may be any type of vehicle, such as a tractor. The material delivery vehicle 102 of FIG. 1 is traveling in a direction of motion shown with arrow 107.

The material delivery vehicle 102 typically pushes or pulls the crop sensing head 104 and the applicator 106. The crop sensing head 104 is a sensor that can determine the material requirements of the crops. There may be one crop sensing head or many crop sensing heads connected to (or as part of) the material delivery vehicle 102. In one embodiment, the crop sensing head 104 is a reflectance-based sensor with one or more light sources and one or more detectors for determining crop needs such as nitrogen and water requirements, plant crop height, etc. The crop sensing head 104 may be able to operate in daylight and/or at night. In one embodiment, the material delivery vehicle 102 pushes or pulls the crop sensing head 104 over an area of crops first and then the applicator 106 applies the material to the crops as the vehicle 102 moves along the direction of motion 107. During the time interval between when the crop sensing head 104 senses the crops and when the applicator 106 applies the material to the crops, the amount of material that will be applied to the crops can be determined and/or adjusted.

The crop sensing head 104 may be configured differently for the different crops that the sensing head 104 senses. In one embodiment, different crop sensing heads are used for the different crops. Examples of crops include cereal grains, wheat, rice, corn, maize, oil seeds, canola, potatoes, cotton, and sugar cane.

The applicator 106 is one or more device that physically applies the material to the crops. The delivery vehicle 102 may contain one or more material tanks that are connected to the applicator 106 and used to fill the applicator 106 with material. As shown, the applicator 106 can include a sprayer valve 108. The sprayer valve 108 is a valve that controls flow of liquid material onto the crops. The sprayer valve 108 may be connected to nozzles (e.g., nozzles 112 and 113) which spray the material out at various times and/or rates.

The applicator controller 105 can include a sprayer valve controller 116 to control the sprayer valve 108. The applicator controller 105 includes a microprocessor and controls the operation of the sprayer valve 108. For example, the applicator controller 105 can adjust the rate(s) and/or time(s) that one or more nozzles spray the material onto the crops. The applicator controller 105 may be external to or internal to the sprayer valve 108.

The applicator 106 can also include a spreader valve 120. The spreader valve 120 is a valve that hydraulically controls the flow of granular material onto the crops. The spreader valve 120 can regulate flow of a predetermined amount of material onto the crops during a given amount of time.

The applicator controller 105 may include a spreader valve controller 124 to control the spreader valve 120. The applicator controller 105 can determine the rate(s) and/or time(s) that the spreader valve 120 spreads the material. In one embodiment, the applicator controller 105 (e.g., the sprayer valve controller 116 and/or the spreader valve controller 124) can be adjusted before, during, or after the sensing of the crops by the crop sensing head 104. The applicator controller 105 may be external to or internal to the spreader valve 120.

The material delivery vehicle 102 includes a delivery vehicle controller 128. As described in more detail below, the delivery vehicle controller 128 controls the movement of the material delivery vehicle 102. For example, the material delivery vehicle 102 may be driven automatically (i.e., without a person driving the delivery vehicle 102) and the delivery vehicle controller 128 may control the rate of the delivery vehicle 102, the direction of the delivery vehicle 102, etc.

The delivery vehicle 102 also includes an agriculture controller 132. The controllers 105, 128 and crop sensing head 104 are in communication with the agriculture controller 132. The communication may be over one or more (wireless or wired) communication buses (shown with dashed lines 140, 144, and 148). The agriculture controller 132 integrates the information from the controllers 105, 128 and the crop sensing head 104 to determine how to move (e.g., drive) the material delivery vehicle 102 in relation to the needs of the crop based on crop data sensed by the crop sensing head 104 (and, in one embodiment, based on applicator data from the applicator controller 105). This integration of information from the delivery vehicle controller 128, the applicator controller 105, and the crop sensing head 104 enables optimal delivery of the material to the crops.

The agriculture controller 132 may use this information to transmit one or more movement commands to the delivery vehicle controller 128 in order to adjust the movement of the delivery vehicle 102. For example, the agriculture controller 132 can determine when to turn the material delivery vehicle 102 and can adjust the speed of the delivery vehicle 102 based on the information it receives from the controllers 105, 128 and the crop sensing head 104. This integration of information from the controllers 105, 128 and crop sensing head 104 enables the material delivery vehicle 102 to apply the correct amount of material to the crops regardless of, for instance, the layout of the terrain and the path that the delivery vehicle is traveling.

Figure 2:
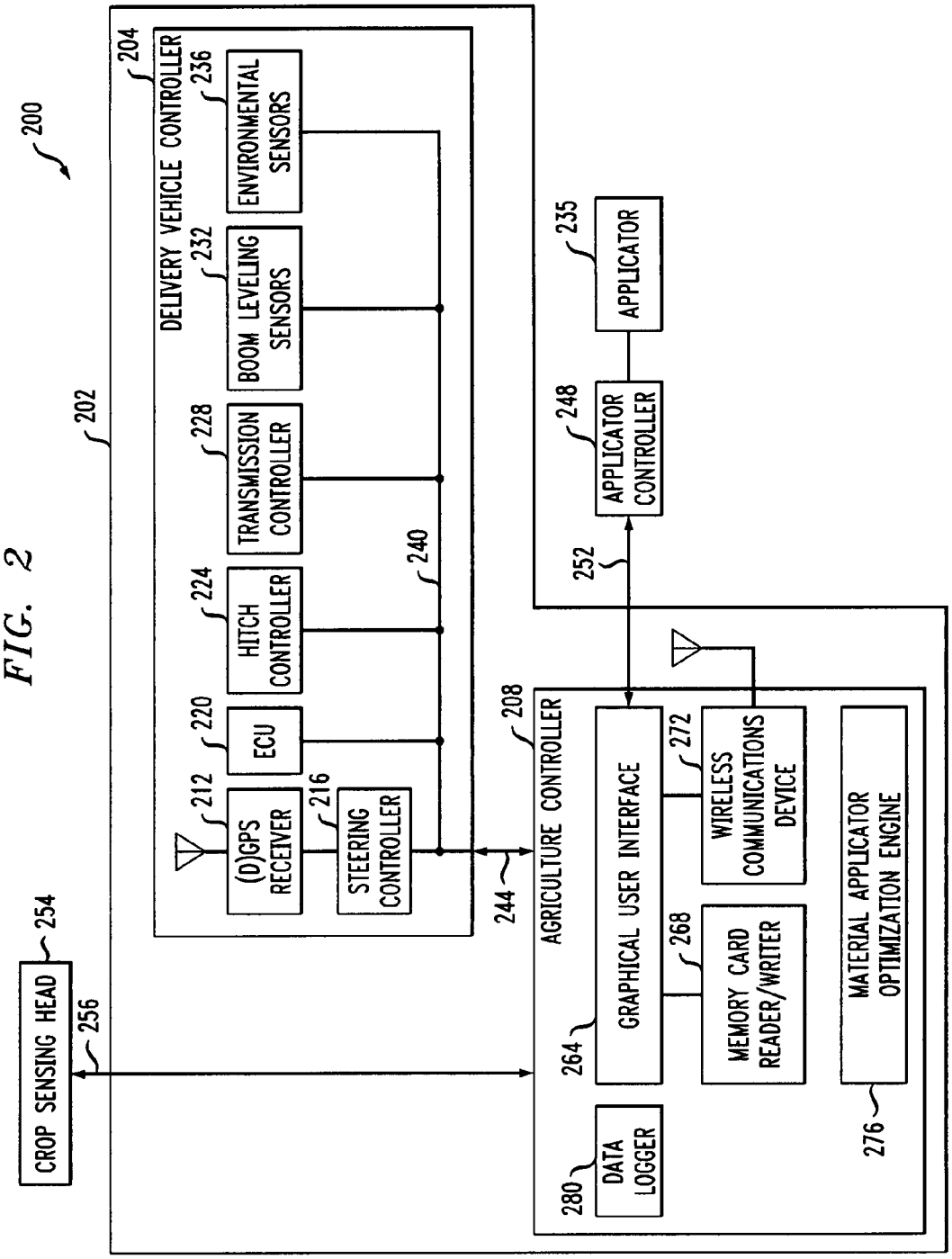
FIG. 2 is a more detailed block diagram of a material delivery system in accordance with an embodiment of the present invention.

FIG. 2 shows a more detailed block diagram of a material delivery system 200 in accordance with an embodiment of the present invention. The material delivery system 200 includes a material delivery vehicle 202 having a delivery vehicle controller 204 in communication with agriculture controller

208. The delivery vehicle controller 204 includes various controllers to control the material delivery vehicle 202.

In one embodiment, the delivery vehicle controller 204 includes a Global Positioning Satellite (GPS) receiver 212 to determine the delivery vehicle's location. In communication with the GPS receiver 212 is a steering controller 216 to control the delivery vehicle's direction. For example, if the material delivery vehicle 202 has a particular course to travel, the GPS receiver 212 and the steering controller 216 are used to guide and direct the delivery vehicle 202 to its destination. The GPS receiver 212 and/or the steering controller 216 may also include slope sensors to determine the slope of the terrain on which the delivery vehicle is located.

The delivery vehicle controller 204 may also include an engine control unit (ECU) 220. The ECU is an electronic control unit which controls various aspects of the vehicle engine's operation. In one embodiment, the ECU controls the quantity of fuel injected into each cylinder of each engine cycle, ignition timing, and other engine parameters. The ECU may include one or more sensors to determine the quantity of fuel, ignition timing, and other parameters.

The delivery vehicle 202 may also include a hitch. The hitch is typically used when the delivery vehicle 202 lifts something up or places something down. The hitch includes the delivery vehicle's hydraulic system, attaching points, lifting arms, and stabilizers. In this embodiment, the delivery vehicle controller 204 includes a hitch controller 224. In one embodiment, the hitch controller 224 uses a stepper motor to control the hitch.

The delivery vehicle controller 204 may also include a transmission controller 228. The transmission controller 228 controls the rate of the material delivery vehicle 202 by adjusting the amount of power delivered to the delivery vehicle's transmission.

The delivery vehicle controller 204 also includes boom leveling sensors 232. Boom leveling sensors 232 adjust the distance between applicator 235 and the crop.

The delivery vehicle controller 204 can also include environmental sensors 236. The environmental sensors 236 can detect one or more of moisture, humidity, water quality, wind speed and direction, ambient temperature, radiation (e.g., solar radiation or ultraviolet radiation), smoke, dust sensors, and any other environmental condition. The environmental sensors 236 may use the information sensed by the sensors to adjust the movement of the delivery vehicle 202. For example, if the environmental sensors 236 determine that the ground is damp, the delivery vehicle controller 204 may cause the material delivery vehicle 202 to travel slower.

Each controller 216, 220, 224, 228 and each sensor 232, 236 of the delivery vehicle controller 204 are in communication with the agriculture controller 208 via one or more communication buses (shown as bus 240 in communication with bus 244). The communication buses 240, 244 may be wired or wireless buses.

The agriculture controller 208 receives information about the delivery vehicle via the delivery vehicle controller 204 (via communication bus 244), receives information about the applicator via applicator controller 248 (via applicator controller bus 252), and receives information about the crops from crop sensing head 254 (via crop sensing head bus 256). As a result, the agriculture controller 208 can integrate the information from these controllers and crop sensing head to efficiently apply the correct amount of material to the crop(s) (e.g., during a predetermined amount of time).

In one embodiment, the agriculture controller 208 includes a graphical user interface (GUI) 264 to enable a user to interact with the controller 208. In one embodiment, a user can use the GUI to select which material and/or adjust how much material is being applied via the applicator 235. The agriculture controller 208 may also include a memory card reader/writer 268 which enables a user to insert a memory card and read or write data from/to the card. The agriculture controller 208 may also include a wireless communication device 272 which enables the agriculture controller 208 to communicate with other agriculture controllers wirelessly (as described in more detail below).

Additionally, the agriculture controller 208 includes a material applicator optimization engine 276. The material applicator optimization engine 276 optimizes the applying of material based on the information received from the delivery vehicle controller 204 and the applicator controller 248. The optimization engine 276 adjusts the delivery vehicle's movement based on the information the engine 276 receives. The information may also result in the optimization engine 276 determining an optimal path of motion that the delivery vehicle 202 should travel. In a further embodiment, the information may result in the optimization engine 276 determining the optimal gear to set on the delivery vehicle's power transmission in order to minimize the diesel consumption of the engine when following the optimal path of motion (e.g., considering slopes in the terrain). The optimization engine 276 can also keep the vehicle ground speed within a desired range in order to maintain an adequate spray pattern for the particular application spray tip or nozzle orifice being used for liquid application of material. The optimization engine 276 may also cause the delivery vehicle 202 to deliver different material at different times or rates.

In one embodiment, the agriculture controller 208 includes a data logger 280 to log the data it receives from the various controllers 204, 248 and/or crop sensing head(s) 254. The user may view the data using the GUI 264 and/or may edit the data. The data logger 280 may include a microprocessor and memory.

Figure 3:
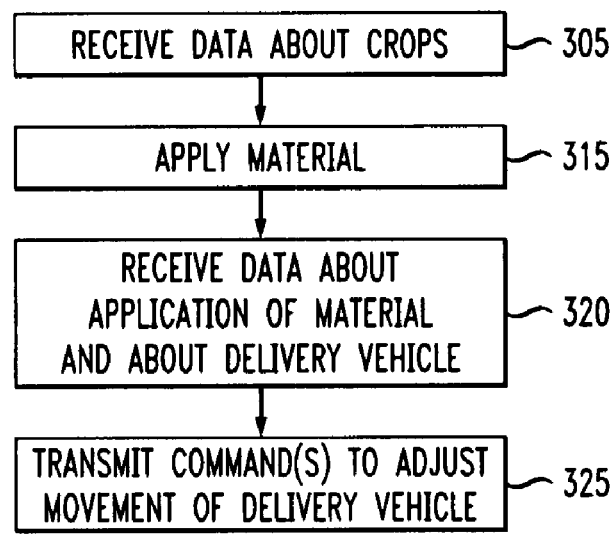
FIG. 3 is a flowchart of the steps performed by a material delivery system in accordance with an embodiment of the present invention.

FIG. 3 is a flowchart of the steps performed by a material delivery system in accordance with an embodiment of the present invention. The delivery vehicle moves across (or around) a field of crops and the crop sensing head gathers crop data by moving over or near the crops. The delivery vehicle (e.g., the agriculture controller) receives this data from the crop sensing head in step 305. In one embodiment, the agriculture controller adjusts the movement of the delivery vehicle based on the crop data received from the crop sensing head in step 305. The applicator applies material to the crops in step 315.

The agriculture controller further receives data from the applicator controller regarding, for instance, the operation of the applicator and the delivery of the material (e.g., how much material is being delivered) in step 315. The agriculture controller also receives the crop data from the crop sensing head. The agriculture controller either simultaneously or at some other time (after (or before) step 315) receives data from the delivery vehicle controller (shown in step 320), such as the rate and direction of the material delivery vehicle.

The agriculture controller then transmits one or more movement commands to adjust the movement of the material delivery vehicle based on some or all of the received data in step 325. For example, the agriculture controller may determine to change the rate of the delivery vehicle (e.g., slow the delivery vehicle down at a particular point in the path) or change the direction of the delivery vehicle.

Figure 4:
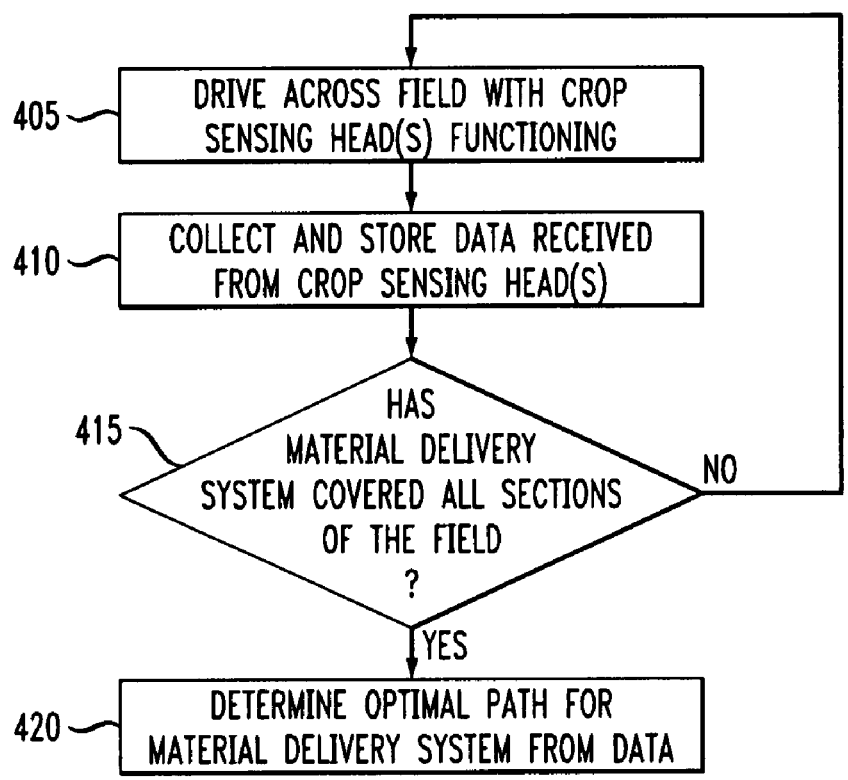
FIG. 4 is a flowchart of the steps performed by a material delivery system to determine an optimal path for the system in accordance with an embodiment of the present invention.

FIG. 4 shows a flowchart of the steps performed by a material delivery system to determine an optimal path of the material delivery system in accordance with an embodiment of the present invention. The material delivery system (i.e., the material delivery vehicle with the applicator (and applicator controller) and crop sensing head shown in FIG. 1) drives (i.e., follows a predetermined path) across (or along or around) a field having crops in step 405. The crop sensing head(s) are operational during these movements on the field. The crop sensing head(s) collect crop data in the field in step 410 and transmit the data to the agriculture controller. The agriculture controller stores the crop data received from the crop sensing head(s) in step 410. The agriculture controller then determines whether the material delivery system has covered all sections of the field in step 415.

In one embodiment, the agriculture controller makes this determination by comparing the received crop data from the crop sensing head(s) to a stored map of the field. This map may be, for example, a result of one or more previous drives around the field. Based on this comparison, the agriculture controller determines whether the material delivery system should continue driving or should stop because the system has gone over every area of the field. In one embodiment, the agriculture controller stops the system when the system has gone over the entire field. Alternatively, the agriculture controller can transmit a message to the driver of the material delivery system to stop the material delivery vehicle.

In one embodiment, to make this determination, the agriculture controller receives crop data from the crop sensing head(s) as well as data regarding the coordinates (X, Y, and Z positions) of the center of gravity of the material delivery vehicle. In one embodiment, the GPS receiver and/or steering controller, as described above, determine the coordinates of the center of gravity of the delivery vehicle and the agriculture controller uses these coordinates in conjunction with the crop data received from the crop sensing head(s) to determine whether the material delivery system has covered the entire field.

In one embodiment, the received data may be packaged into a specific data format. For example, the specific data format may include a position of the vehicle, the measurements captured by the crop sensing head(s), and/or light reflectance information.

If the material delivery system has not covered the entire field, the process returns to step 405 and the material delivery vehicle continues driving around the field. If, however, the material delivery system has covered the entire field, an optimal path for the material delivery system can be determined from the received data in step 420.

In one embodiment, the agriculture controller generates a crop requirements map and specific shape lines that surround the areas that do not require specific actions of watering or nutrition. The shape lines are utilized by the agriculture controller to correct a line of motion typically traveled by the material delivery vehicle in order to go around areas that do not need material.

Figure 5:
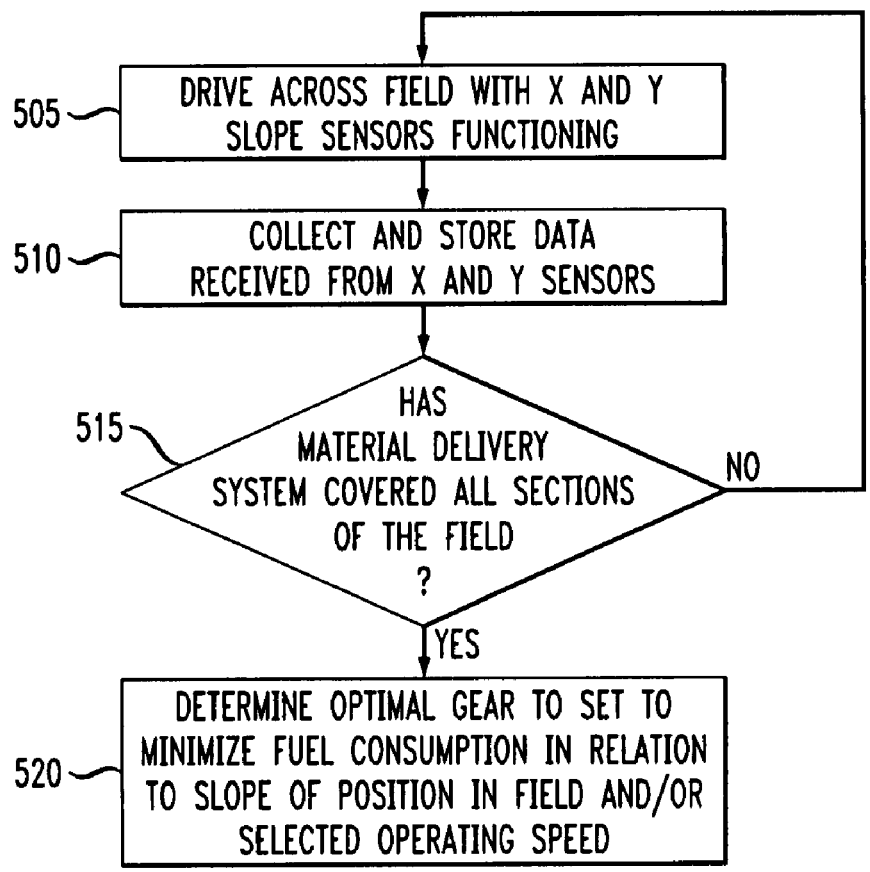
FIG. 5 is a flowchart of the steps performed by a material delivery system to determine an optimal gear for the system in accordance with an embodiment of the present invention.

FIG. 5 shows a flowchart of the steps performed by a material delivery system to determine an optimal gear to set on the delivery vehicle's power transmission in order to minimize the diesel consumption of the engine when following the optimal path of motion (considering slopes in the terrain) in accordance with an embodiment of the present invention.

The material delivery vehicle drives (i.e., follows a predetermined path) across (or along or around) a field having crops in step 505. X and Y slope sensors are functioning during this movement across, along, or around the field.

The X and Y slope sensors then collect and store (e.g., in a data file) the slopes at all points in the field that the material delivery vehicle traverses in step 510. The agriculture controller then determines whether the material delivery system has covered all sections of the field in step 515.

In one embodiment, the agriculture controller makes this determination by comparing the received data from the slope sensors to a stored map of the field. This map may be, for example, a result of one or more previous drives around (or across or along) the field. Based on this comparison, the agriculture controller determines whether the material delivery vehicle should continue driving or should stop because the system has gone over every area of the field.

In one embodiment, to make this determination, the agriculture controller receives data from the slope sensors as well as data regarding the coordinates (e.g., X and Y positions) of the center of gravity of the material delivery vehicle. In one embodiment, the agriculture controller uses these coordinates in conjunction with the data received from the slope sensors to determine whether the material delivery system has covered the entire field.

In one embodiment, the data may be packaged into a specific data format. For example, the specific data format may include a position of the vehicle (X, Y), the slope along the X axis, and the slope along the Y axis.

The agriculture controller then analyzes the data to determine an optimal gear of the delivery vehicle's transmission to set to minimize the fuel consumption of the vehicle in relation to the slope of a position in the field and/or the selected operating speed in step 520. In one embodiment, the agriculture controller analyzes the data and generates a specific movement command that the controller sends to the vehicle's transmission controller to execute a shift in the gear. This can occur, e.g., periodically or continuously.

In a further embodiment, the data file containing the different slopes in the field can be reused when other agriculture controller operations need to be performed on the same field using the pattern of slopes.

Figure 6:
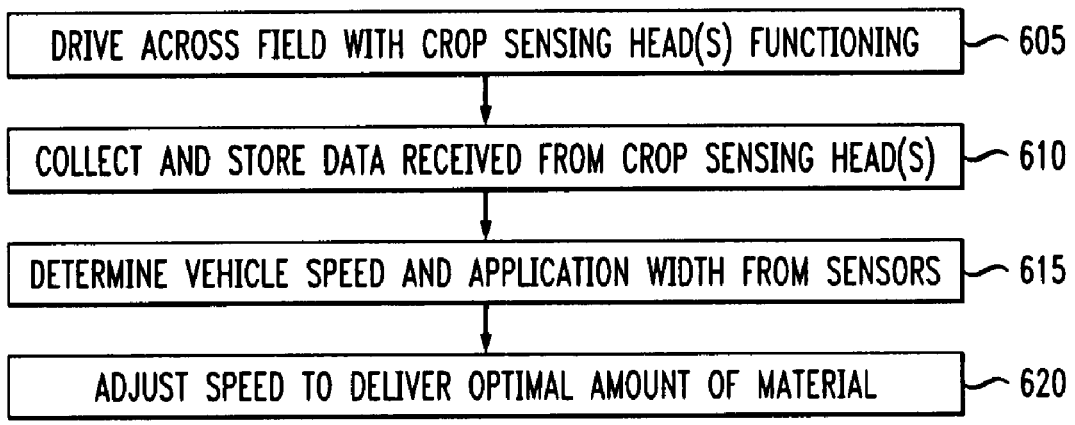
FIG. 6 is a flowchart of the steps performed by a material delivery system to adjust the speed to deliver an optimal amount of material in accordance with an embodiment of the present invention.

FIG. 6 shows a flowchart of the steps performed by a material delivery system to determine an optimal speed of the material delivery vehicle in accordance with an embodiment of the present invention. The material delivery system drives (i.e., follows a predetermined path) across (or along or around) a field having crops in step 605. The crop sensing head(s) are operational during these movements on the field. The crop sensing head(s) collect and store crop data in step 610 and may transmit the crop data to the agriculture controller. The agriculture controller uses the crop data to determine crop nutritional requirements in a metric of volume per area (e.g., kilogram per hectacre).

During the receipt of the crop data from the crop sensing head(s), the agriculture controller may also determine vehicle speed and/or application width from sensors. The agriculture controller can then adjust (increase, maintain, or decrease) vehicle speed to deliver an optimal amount of material in step 620. For example, the agriculture controller may determine the minimum or maximum speed to enact proper distribution of a granular material, minimum or maximum pressures to maintain appropriate spray pattern of a liquid material as distributed from a fixed orifice, and/or the capability to increase or decrease vehicle speed enabling appropriate application rate as width and speed over which the application is occurring.

As a specific example, the agriculture controller may transmit movement commands to the delivery vehicle controller to slow the delivery vehicle down when the needs of the crop(s) dictate an application rate greater than the maximum application rate at a given speed. As a result, the vehicle is slowed down to effectively increase the application rate. The reverse scenario can also be applied (i.e., the delivery vehicle's speed is increased when the needs of the crop(s) dictate an application rate less than the minimum application rate at a given speed).

The agriculture controller can log a record of material characteristics, such as the application date, time and material applied as well as the vehicle speed to serve as a record of the application.

Figure 7:
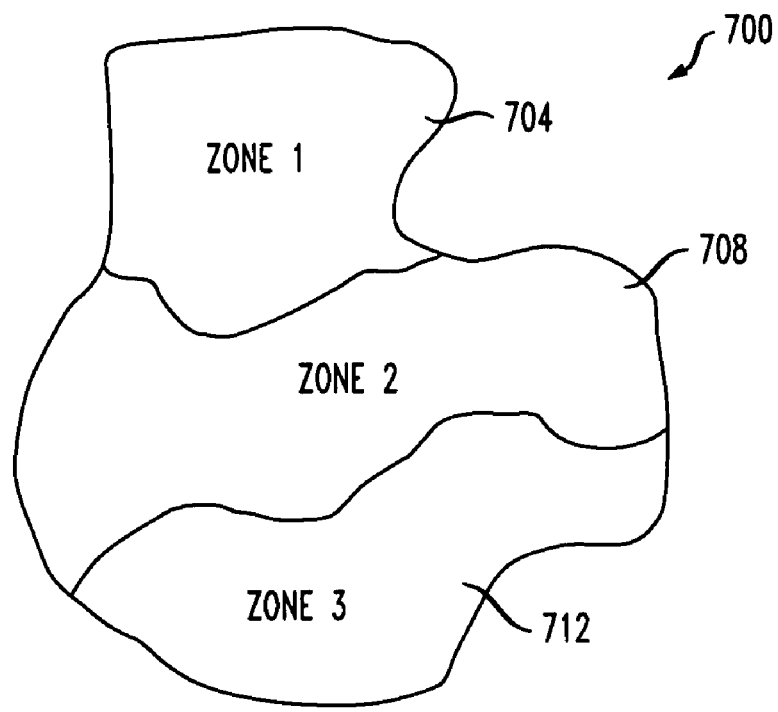
FIG. 7 is a block diagram of three zones that a material delivery system can traverse in accordance with an embodiment of the present invention.

FIG. 7 shows a block diagram of a field 700 having three zones 704, 708, 712 in accordance with an embodiment of the present invention. The material delivery system applies a liquid material in the field 700 using a fixed application spray nozzle which maintains a satisfactory spray pattern within a range of, e.g., 4-6 bar pressure.

For example, in zone 1 704, the determined application rate is set to 6X, the vehicle speed is set to Y, and the pressure at fixed application spray nozzle is set to 5 bar. Zone 2 708, however, has different settings. Zone 2 has a determined application rate of 4X, a vehicle speed of 2Y, and a pressure fixed application spray nozzle at 5.5 bar. Zone 3 712 has a determined application rate of 1X, vehicle speed is increased to 3Y while pressure at fixed application spray nozzle is maintained at 5 bar.

In another embodiment, the agriculture controller of one material delivery vehicle can communicate with a wireless network (e.g., built locally in the working field by putting receivers and transmitters on one or more other agriculture controllers of material delivery vehicles). Further, all of the agriculture controllers can communicate over a wireless network with a main computer (located on a remote station or on one of the agriculture controllers). The main computer may perform the data logging described above. The main computer may also transmit and/or receive commands to/from the agriculture controllers. This wireless network enables the sharing of data measured or received by one agriculture controller with other agriculture controllers (e.g., in order to facilitate the performance of their controlling functions with less use of sensors). Thus, each agriculture controller may communicate with one or more other agriculture controllers and/or a main, external computer located at a remote site from the field (or internal to a delivery vehicle).

The communication between agriculture controllers can be via, for instance, a peer-to-peer relationship (a delivery vehicle interacts with a second delivery vehicle) or a master-slave relationship (one delivery vehicle follows commands from another delivery vehicle).

Figure 8:
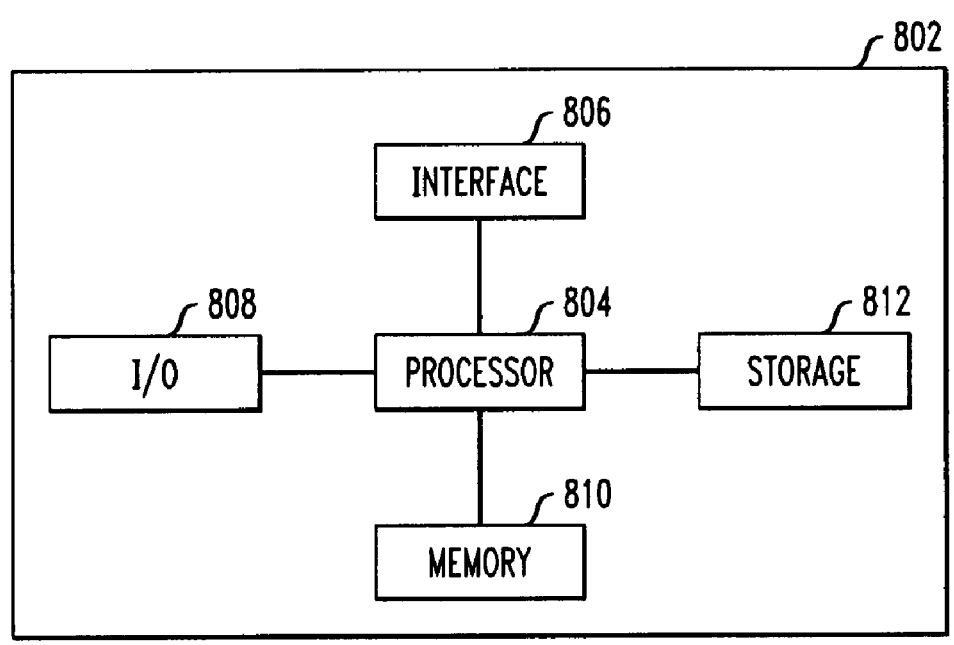
FIG. 8 shows a high level block diagram of a computer in accordance with an embodiment of the present invention.

The description herewith describes the present invention in terms of the controller functions required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 8. Computer 802 contains a processor 804 which controls the overall operation of computer 802 by executing computer program instructions which define such operation. The computer program instructions may be stored in a storage device 812 (e.g., magnetic disk) and loaded into memory 810 when execution of the computer program instructions is desired. Computer 802 also includes one or more interfaces 806 for communicating with other devices (e.g., locally or via a network). Computer 802 also includes input/output 808 which represents devices which allow for user interaction with the computer 802 (e.g., display, keyboard, mouse, speakers, buttons, etc.).

One skilled in the art will recognize that an implementation of an actual computer will contain other components as well, and that FIG. 8 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus comprising:
   a delivery vehicle configured to move across a field;
   a sensor configured to obtain crop data during movement of the delivery vehicle across said field;
   a delivery vehicle controller configured to automatically control the movement of the delivery vehicle; and
   an agriculture controller configured to:
      determine, during the movement of the delivery vehicle, needs of said crop based on said crop data;
      determine movement commands to adjust said movement of said delivery vehicle, said movement commands comprising commands to change a direction of the delivery vehicle, based on said needs of said crop; and
      transmit said movement commands to said delivery vehicle controller.

2. The apparatus of claim 1 further comprising an applicator controller in communication with said agriculture controller and a material applicator, and configured to control said material applicator.

3. The apparatus of claim 2 wherein said movement commands are further based on applicator data received from said applicator controller.

4. The apparatus of claim 1 wherein said agriculture controller further comprises a data logger configured to log said crop data.

5. The apparatus of claim 1 wherein said agriculture controller further comprises a material applicator optimization engine configured to optimize application of said material.

6. The apparatus of claim 1 wherein said delivery vehicle controller further comprises at least one of a Global Positioning Satellite receiver, a steering controller, an Engine Control Unit (ECU), a hitch controller, a transmission controller, a boom leveling sensor, and an environmental sensor.

7. The apparatus of claim 1 further comprising a slope sensor connected to said agricultural controller, said slope sensor configured to determine a slope of terrain that said delivery vehicle is located on.

8. A method comprising:
   sensing crop data during movement of a delivery vehicle;
   determining, during the movement of the delivery vehicle, needs of said crop from said crop data; and controlling said movement of said delivery vehicle based on said needs of said crop, wherein controlling the movement of the delivery vehicle comprises changing a direction of the delivery vehicle based on said needs of said crop.

9. The method of claim 8 wherein said controlling said movement further comprises transmitting movement commands to a delivery vehicle controller in communication with said delivery vehicle to cause said delivery vehicle to follow a predetermined path.

10. The method of claim 8 wherein said controlling said movement further comprises adjusting a gear set in a transmission system of said delivery vehicle.

11. The method of claim 10 wherein said adjusting a gear further comprises adjusting said gear to minimize fuel consumption in relation to a slope of a position of said delivery vehicle.

12. The method of claim 11 wherein said adjusting a gear further comprises adjusting said gear to minimize fuel consumption in relation to a speed of said delivery vehicle.

13. The method of claim 8 wherein said controlling said movement of said delivery vehicle further comprises adjusting speed of said delivery vehicle.

14. The method of claim 13 wherein said adjusting speed of said delivery vehicle further comprises increasing speed when an application rate of said material is less than a minimum application rate at a current speed.

15. The method of claim 13 wherein said adjusting speed of said delivery vehicle further comprises reducing speed when an application rate of said material is greater than a maximum application rate at a current speed.

16. An apparatus comprising:
means for sensing crop data during movement of a delivery vehicle;
means for determining, during the movement of the delivery vehicle, needs of said crop from said crop data; and
means for controlling said movement of said delivery vehicle based on said needs of said crop, wherein controlling the movement of the delivery vehicle comprises changing a direction of the delivery vehicle based on said needs of said crop.

17. The apparatus of claim 16 wherein said means for controlling said movement further comprises means for transmitting movement commands to a delivery vehicle controller in communication with said delivery vehicle to cause said delivery vehicle to follow a predetermined path.

18. The apparatus of claim 16 wherein said means for controlling said movement further comprises means for adjusting a gear set in a transmission system.

19. The apparatus of claim 18 wherein said means for adjusting a gear further comprises means for adjusting said gear to minimize fuel consumption in relation to a slope of a position.

20. The apparatus of claim 18 wherein said means for adjusting a gear further comprises means for adjusting said gear to minimize fuel consumption in relation to a speed.

21. The apparatus of claim 16 wherein said means for controlling said movement further comprises means for adjusting speed of said delivery vehicle.

22. The apparatus of claim 21 wherein said means for adjusting speed of said delivery vehicle further comprises means for reducing speed when an application rate of said material is greater than a maximum application rate at a current speed.

23. The apparatus of claim 21 wherein said means for adjusting speed of said delivery vehicle further comprises means for increasing speed when an application rate of said material is less than a minimum application rate at a current speed.

* * * * *